United States Patent [19]

Sheehan et al.

[11] E Re. 31,376

[45] Reissued Sep. 13, 1983

[54] YARN STRUCTURE AND METHOD FOR PRODUCING SAME

[75] Inventors: Richard W. Sheehan; David B. Parlin; Harry F. Jamrogowicz, all of Greenville; John A. Patterson, Abbeville, all of S.C.

[73] Assignee: Bigelow-Sanford, Inc., Greenville, S.C.

[21] Appl. No.: 224,461

[22] Filed: Jan. 12, 1981

Related U.S. Patent Documents

Reissue of:

[64] Patent No.: 3,846,968
Issued: Nov. 12, 1974
Appl. No.: 368,875
Filed: Jun. 11, 1973

[51] Int. Cl.[3] ..... D02G 3/34; D02G 3/24; D02G 3/12; D02G 1/16

[52] U.S. Cl. ..... 57/208; 28/274; 57/245; 57/350; 57/908

[58] Field of Search ..... 57/206–209, 57/244–247, 350, 351, 908; 28/271–276

[56] References Cited

U.S. PATENT DOCUMENTS

| | | | |
|---|---|---|---|
| 3,009,309 | 11/1961 | Breen et al. | 57/207 |
| 3,069,836 | 12/1962 | Dahlstrom et al. | 57/908 X |
| 3,110,151 | 11/1963 | Bunting, Jr. et al. | 57/206 X |
| 3,286,321 | 11/1966 | Fletcher et al. | 57/208 X |
| 3,394,440 | 7/1968 | Van Holten | 28/274 |
| 3,417,445 | 12/1968 | Gemeinhardt et al. | 57/208 X |
| 3,473,315 | 10/1969 | LeNoir | 57/208 X |
| 3,563,021 | 2/1971 | Gray | 57/206 X |
| 3,568,426 | 3/1971 | Whitley | 57/908 X |
| 3,678,675 | 7/1972 | Klein | 57/244 X |
| 3,763,643 | 10/1973 | Buzano | 57/208 |
| 3,824,776 | 1/1972 | London, Jr. | 57/208 |

*Primary Examiner*—John Petrakes
*Attorney, Agent, or Firm*—Bell, Seltzer, Park & Gibson

[57] ABSTRACT

A continuous yarn structure comprising at least one yarn element formed from a plurality of continuous filaments or a plurality of staple fiber lengths, the yarn structure comprising periodically repeating lengths of high bulk, substantially unentangled continuous filaments or staple fiber lengths alternating with lengths of compacted continuous filaments of staple fiber lengths in which substantially all filaments or fiber lengths are mutually entangled throughout the volume of the compacted lengths.

Also disclosed is a method for producing such yarn. The method comprises the steps of feeding at least one multiple filament yarn element or multiple staple fiber element under tension to a first treatment zone having a predetermined cross-sectional area; continuously directing a fluid at the yarn element in a direction substantially perpendicular to the travel of the element, the fluid being applied at a pressure of at least about 100 p.s.i.; and then feeding the yarn element directly to an outlet zone of cross-sectional area lesser than the treatment zone cross-sectional area.

9 Claims, 7 Drawing Figures

FIG. 3
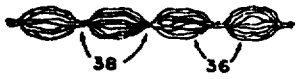
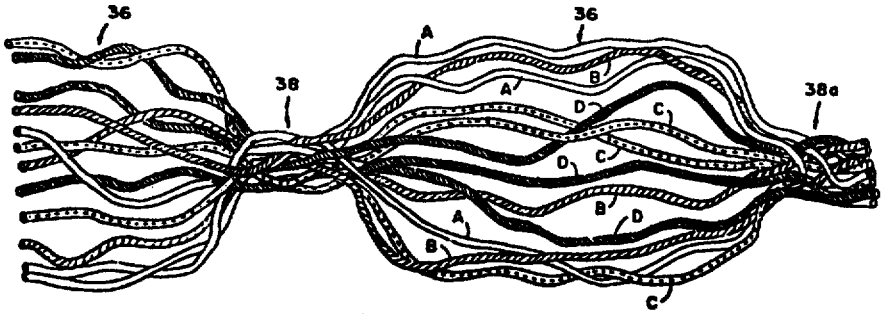
FIG. 4
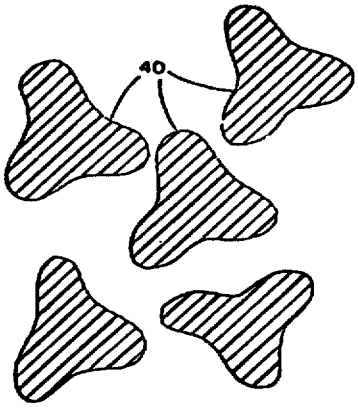
FIG. 6
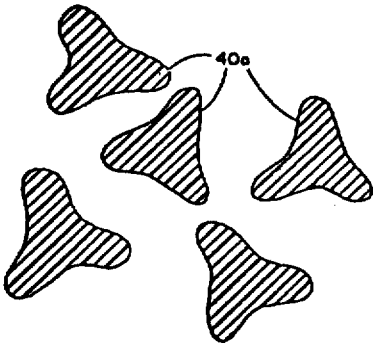
FIG. 7

YARN STRUCTURE AND METHOD FOR PRODUCING SAME

Matter enclosed in heavy brackets [ ] appears in the original patent but forms no part of this reissue specification; matter printed in italics indicates the additions made by reissue.

BACKGROUND OF THE INVENTION

This invention relates to a novel yarn structure and to apparatus and method for producing yarn having such a structure.

Principal objects of the invention are the provision of a yarn structure formed from continuous filaments or staple fiber lengths which has improved stability, as well as the provision of a method of producing such yarn efficiently and inexpensively. Further objects include the provision of such stable yarn which has relatively high average bulk while maintaining high stability.

As discussed further below, the general appearance of a yarn structure according to the invention is that of alternating high bulk and compacted regions along the yarn. Structures having this general appearance, and thus superficially similar to the structure as disclosed herein, are shown in Gemeinhardt et al., U.S. Pat. No. 3,417,445 and Breen et al., U.S. Pat. No. 3,009,309.

SUMMARY OF THE INVENTION

A continuous yarn structure constructed according to the invention comprises at least one yarn element formed from a plurality of continuous filaments or staple fiber lengths. The yarn structure comprises periodically repeating lengths of high bulk, substantially unentangled yarn element filaments or fiber lengths alternating with lengths of compacted yarn element filaments or fiber lengths in which substantially all filaments or fiber lengths are mutually entangled throughout the volume of the compacted lengths. In preferred embodiments each compacted length is shorter than the adjacent high bulk lengths (e.g., high bulk lengths of approximately one-half inch and compacted lengths of approximately one-eighth inch); however, the bulky lengths can have a greater length without adversely effecting the novel characteristics of the yarn or the approximate length of the compacted lengths; and the filaments or fiber lengths take a random and ever changing position not only in relation to its clockwise position to other filaments or fiber lengths but also in relation to contacting or separating from other filaments or fiber lengths in the high bulk lengths in the yarn structure; and at least some of the individual filaments or fiber lengths have a lesser cross-sectional area in the high bulk lengths of the yarn structure than in the compacted lengths.

In another aspect, the invention features a method of producing a continuous yarn having lengths in which the yarn is compacted alternating with lengths in which the yarn is bulky. The method comprises the steps of feeding at least one multiple yarn element with substantially no overfeed to a first treatment zone having a predetermined cross-sectional area; continuously directing a fluid at said yarn element in a direction perpendicular to the travel of said element, said fluid being applied at a pressure of from about 100 p.s.i. to about 250 p.s.i.; and then feeding the yarn element directly to an outlet zone of cross-sectional area lesser than the cross-sectional area of the treatment zone. Preferably, a plurality of multiple yarn elements are simultaneously continuously fed under tension to the treatment zone. The multiple yarn elements can have a twist ranging from zero to as high as 4 T.P.I.

DETAILED DESCRIPTION OF THE DRAWINGS

Other objects, features, and advantages of the invention will appear from the following description of preferred embodiments taken together with the accompanying drawings. In the drawings:

FIG. 3 is a side elevation of a yarn structure according to the present invention;

FIG. 4 is an enlarged view of a portion of FIG. 3;

FIG. 6 illustrates a cross-sectional fiber outline of a 1300 denier nylon producer supplied yarn taken prior to processing by the method of this invention; and FIG. 7 illustrates a cross-sectional fiber outline of the yarn of FIG. 6 after it was processed by the method of this invention.

DESCRIPTION OF PREFERRED EMBODIMENTS

Figure 1:
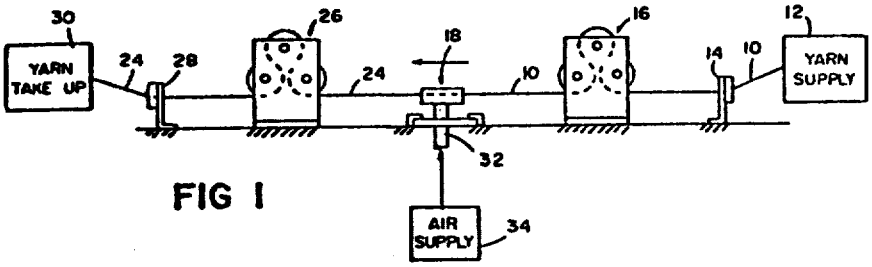
FIG. 1 is a partially schematic side elevation illustrating the method according to the present invention.
Figure 2:
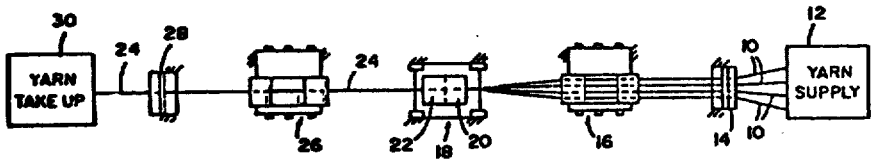
FIG. 2 is a plan view of FIG. 1.

Referring to FIGS. 1 and 2, a plurality of multiple-filament yarn elements 10 are fed from a yarn supply 12 through a yarn guide 14 aligned with yarn feed roll unit 16. The yarn supply 12 may comprise bobbins, tubes, cheeses, unravelling knitted tubes, or any other form in which yarns are stored or processed. From the feed roll unit 16 yarns 10 are fed to the treatment unit 18, having chambers 20 and 22, from which they emerge as a unitary yarn structure 24 which passes to take-up roll unit 26. After passing through a guide 28 the yarn structure 20 proceeds to a yarn take-up device 30 of any conventional design for storage or further processing.

The treatment unit 18 comprises a base having internal recesses defining a treatment zone comprising a first chamber 20 and an outlet zone in the form of a coaxial chamber 22. An air inlet communicates with chamber 20 in a direction perpendicular to the axis of the chambers 20, 22. Air line 32 delivers an uninterrupted supply of high pressure air from an air supply 34 to chamber 20.

It has been discovered that various unexpected requirements must be met to produce a yarn structure according to the present invention. The yarn 24, and its component yarn elements 10, must be fed at a rate that permits elongation as they pass through the treatment unit 18. Thus, the conventional overfeed of the yarn to the treatment zone as is common with prior art jet yarn treatment units (which achieve other yarn structures) must be avoided. According to the present invention, it is preferred that the take-up roll unit 26 be driven between 0 percent to 2 percent faster, depending upon the degree of elongation or drafting that is taking place, than the feed roll unit 16. Also, the air is supplied to the chamber 20 through the air inlet continuously as contrasted with the more typical pulsed air jets of other units, and, importantly, the air is supplied at a much higher pressure (e.g., not less than about 100 p.s.i.) than has heretofore been deemed desirable. Referring to FIGS. 3 and 4, the yarn structure according to the present invention is illustrated in a very simple form in which it comprises four separate continuous filament yarns each having but three filaments. (Typically, continuous filament yarns have many more filaments than three.) The four yarns are identified as A, B, C, and D, with each of the three filaments for each yarn being identified with the appropriate letter. The yarn structure includes alternating high bulk regions 36 and compacted regions 38. The bulk regions 36 are longer than the compacted regions 38 and, in one particular preferred embodiment, the bulky regions 36 will be approximately one-half inch long and the compacted regions 38 will be approximately one-eighth inch long.

In the high bulk regions 36 the individual filaments are in general unentangled with each other, with at most some minor contact and/or entanglement of adjacent filaments around the periphery and within the interior of the filament bundle of which the region 36 is composed. In sharp contrast with this filament arrangement in the regions 36 is the thorough entanglement of substantially all filaments in the highly compacted regions 38. As best seen in the compacted region 38a at the right hand side of FIG. 4, the entangling of the filaments extends throughout the volume of the compacted regions 38 and is to be distinguished from the more conventional twisting or false twisting of only the outermost filaments in a compacted region. The full volume entanglement of substantially all filaments provides an improved stability for the yarn structure as a whole, since unravelling or loss of false twist can never be a problem. Additionally, the entanglement throughout the volume of the regions 38 is important in assuring a truly random wandering of each individual filament throughout the volume of the yarn structure as its path is traced along the length thereof. This randomness is especially desirable when yarn elements of varying colors or other characteristics are employed in forming the yarn structures, so that unwanted streaks of a particular color or other characteristics may be avoided. This characteristic renders such yarn structures highly suitable for use in modern Moresque-type pile carpets. These yarn structures will produce a pile carpet that is substantially free from striae effects, streaks and other undesirable concentrations of one or more of the various colors in the yarn. Yarns for these Moresque-type pile carpets are normally made by plying or twisting together individual strands of different colors or color tones to produce a mottled or strippled effect. However, when these yarns of uniform twist or ply are woven or tufted into carpet, they tend to assume positions so that the twist in successive pile elements points or heads in the same direction. With moresque yarns, particularly when the turns per inch match with tuft length in inches, this often results in one ply or color assuming top position in consecutive pile loops or tufts and streaks or unwanted color runs appear in pile surface. As explained previously, the yarns of this invention have the different colors or elements within the yarn appearing in a random and ever changing position which prevents one color or element from appearing in top position in enough consecutive loops or tufts to cause visible streaks.

One or more additional strands of metallic nature can be processed with a plurality of continuous filaments or staple fiber lengths that comprise the unique yarn structure of this invention, to provide static prevention, particularly when the yarns are used to produce carpeting. These anti-static elements can be continuous lengths of copper wire, stainless steel wire, etc., or they can be made from a blend of metallic conductive fibrous material and non-metallic non-conductive fibrous material.

The novel moresque yarn can be produced at a much higher speed than prior art moresque yarns which reduces the time (a cost) required to produce any given number of yards or pounds. Further, the unit length yarn yield is greater than that of prior art moresque yarns that were produced by plying or twisting together two or more single yarn elements with the yarn elements following a helical or convoluted path in the final yarn structure. To obtain a given length of the final twisted yarn, it is necessary to start with a much greater length of untwisted yarn elements. The yarns of this invention have little or no twist in the final yarn structure and the single yarn elements follow, comparatively speaking, a substantially straight path in the final yarn structure; therefore, to obtain a given length of final yarn 2 structure the invention only a slightly greater length of primary yarn elements will be required. In addition, a further distinguishing characteristic of the process of the invention is the fact that it drafts or stretches out to a greater length the individual fibers or filaments, which in itself increases the yield in yards per pound. Referring to FIGS. 6 and 7, which illustrate cross-sections taken of individual yarn elements 40, 40a before and after processing, it can be seen that the cross-sectional area of the processed yarn elements has been reduced when compared to the cross-sectional area of the yarn elements taken prior to processing. The increase in yield over prior moresque yarn processing will be dependent primarily upon the length of the high bulk regions, where the elements follow, comparatively speaking, a substantially straight path, and the degree of drafting is greatest. Some of the gain will be lost in the compacted regions as the yarn elements will be bent, folded and bunched in these regions. The fibers and/or filaments show draft in both high bulk regions and the compacted regions with fibers and/or filaments in the high bulk regions being drafted to a greater extent. *Thus, at least some of the yarn element fibers each have a cross-sectional area in certain portions of the yarn differing in size from that in other portions of the yarn so that at least some of the individual fibers have a lesser cross-sectional area in the final yarn structure than in their unprocessed lengths, i.e., prior to air entanglement.*

Figure 5:
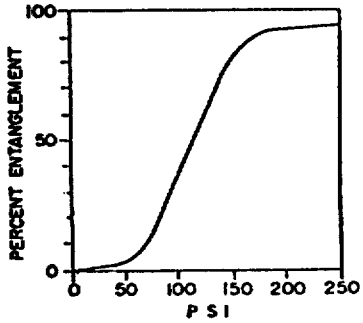
FIG. 5 illustrates graphically the degree of filament entanglement in the yarn's compacted areas as a function of the pressure of the treatment fluid.

The importance of supplying air under unconventionally high pressure to the air inlet has been mentioned above and is illustrated graphically in FIG. 5 where the percent of entanglement of the filaments in the regions 38 is plotted as a function of the air pressure. As is evident from FIG. 5, the entanglement is very incomplete when more conventional air pressures (i.e., less than 100 p.s.i.) are employed. The optimum yarn structure having the benefits as described above is realized at the pressures occurring between about 100 p.s.i. and 200 p.s.i. It is also found that above 200 p.s.i. there is little improvement in filament entanglement with increasing pressure.

While the complete details of the operation of a system as described above to produce a yarn structure as shown in FIGS. 3 and 4 is not entirely understood, it is believed that the continuous supply of air under quite high pressure is a major contributor to the novel features of this yarn structure. It is presently theorized that as the yarn elements 10 enter the chamber 20 they are not only spread apart by the air but also some of the filaments are subjected to a rotational force. This mass of whipsawing rotationally prone filaments becomes more confined as it enters the second chamber 22 and the crossing and interlacing of filaments that is taking place here is exaggerated by the rotational forces being applied to certain filaments. This creates a massed, tangled, intertwined and compacted area of yarn that momentarily blocks, or at least substantially blocks, air flow through the chamber 22. For a brief instant this releases most of the rotational forces acting on the filaments but builds up pressure behind the mass of tangled filaments. A violent "explosion" of the filaments expanding and crossing in all directions is created, while the length of yarn elements immediately behind the compacted area are maintained fixed from a substantial entanglement. This "explosion" also further tightens and snarls the mass of filaments in the compacted areas. As the take-up roll unit 26 pulls the now compacted area out of the chamber 22, the air flow is again free to flow out of the air inlet and will commence to again whipsaw and rotate and entangle the filaments until another log-jam is again built up.

As the mass of tangled filaments are pulled from the chamber 22, the lengths of filament immediately behind the tangled region undergo substantial longitudinal forces and are actually found to be drafted (i.e., have a reduced cross-sectional area as compared to the individual filaments cross-sectional area in the compacted region 38).

While the interaction of all parameters is far from fully understood, it is found that for various types of yarn and various other operating parameters the angling of the paths of the yarn elements 10 and the yarn structure 24 (see FIGS. 1 and 2) with respect to the treatment unit 18 in either or both of the horizontal and vertical directions may create improved entanglement in the regions 38. Angles of up to 45° in the vertical direction and up to 25° in the horizontal direction have been employed successfully.

While various benefits of the method disclosed herein have been discussed above, it should further be noted that a stabilized yarn structure is produced at a production rate which may be up to seven times that of conventional twisting or false twisting apparatus and that various other operations are entirely eliminated (e.g., splicing, twisted spool rewind, etc.).

While particular embodiments of various aspects of the invention herein had been described in detail, it will be appreciated that other embodiments are within the scope of the invention in the following claims.

We claim:

1. A continuous yarn structure comprising at least one *air jet entangled* yarn element formed from a plurality of fibers, said yarn structure comprising lengths of high bulk, substantially un-entangled yarn element fibers alternating with lengths of compacted yarn element fibers in which substantially all fibers are mutually entangled throughout the volume of the compacted *yarn* lengths, *at least some of the yarn element fibers each having a cross-sectional area in certain portions of the yarn differing in size from that in other portions of said yarn so that* at least some of the individual fibers have a lesser cross-sectional area in the final yarn structure than [in their unprocessed lengths] *prior to being air entangled.*

2. The yarn structure as claimed in claim 1 wherein fibers engage with and disengage from adjacent fibers in a random generally straight line path in the high bulk lengths in the yarn structure.

3. The yarn structure as claimed in claim 1 wherein each compacted length is shorter than the adjacent high bulk lengths.

4. The yarn structure as claimed in claim 3 wherein each said compacted length is approximately one-eighth inch and each said high bulk length is approximately one-half inch.

5. The yarn structure as claimed in claim 1 wherein the fibers are continuous filaments.

6. The yarn structure as claimed in claim 1 wherein said yarn element includes electrically conductive material.

7. The yarn structure as claimed *wherein said certain portions of the yarn are said high bulk lengths and said other portions are said compacted lengths and* in claim 1 wherein some of the yarn element fibers *each* have a lesser cross-sectional area in the high bulk lengths than in the compacted lengths.

8. The yarn structure as claimed in claim 7 wherein the fibers are continuous filaments.

*9. A continuous yarn structure of the type suitable for use in forming carpet pile comprising a plurality of air jet entangled yarn elements each formed from a plurality of fibers, said yarn elements being interengagingly combined to provide lengths of high bulk, substantially unentangled yarn element fibers alternating with yarn lengths of compacted yarn element fibers in which substantially all fibers are mutually entangled throughout the volume of the compacted lengths, at least some of the yarn element fibers each having a cross-sectional area in certain portions of the yarn differing in size from that in other portions of said yarn so that at least some of the individual fibers have a lesser cross-sectional area in the final yarn structure than prior to being air entangled.*

* * * * *

UNITED STATES PATENT AND TRADEMARK OFFICE

CERTIFICATE OF CORRECTION

PATENT NO. : Re. 31,376

DATED : September 13, 1983

INVENTOR(S) : Richard W. Sheehan et al

It is certified that error appears in the above-identified patent and that said Letters Patent are hereby corrected as shown below:

In claim 7, column 6, line 30, insert--in claim 1-- between "claimed" and "wherein"

In claim 7, column 6, line 32, delete "in claim 1"

Signed and Sealed this

*Twenty-seventh* Day of *March 1984*

[SEAL]

*Attest:*

GERALD J. MOSSINGHOFF

*Attesting Officer*

*Commissioner of Patents and Trademarks*